United States Patent
Woo

(10) Patent No.: US 12,050,593 B2
(45) Date of Patent: Jul. 30, 2024

(54) METHOD AND APPARATUS FOR BLOCK PROPAGATION IN BLOCKCHAIN PLATFORM

(71) Applicant: ELECTRONICS AND TELECOMMUNICATIONS RESEARCH INSTITUTE, Daejeon (KR)

(72) Inventor: Seungwon Woo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 169 days.

(21) Appl. No.: 17/496,834

(22) Filed: Oct. 8, 2021

(65) Prior Publication Data
US 2022/0147511 A1    May 12, 2022

(30) Foreign Application Priority Data
Nov. 6, 2020 (KR) .................. 10-2020-0147882

(51) Int. Cl.
*G06F 16/23* (2019.01)
*H04L 9/00* (2022.01)
(Continued)

(52) U.S. Cl.
CPC ...... *G06F 16/2379* (2019.01); *G06F 16/2365* (2019.01); *H04L 9/3239* (2013.01); *H04L 67/104* (2013.01); *H04L 9/50* (2022.05)

(58) Field of Classification Search
CPC ............. G06F 16/2379; G06F 16/2365; H04L 9/3239; H04L 67/104; H04L 9/50
(Continued)

(56) References Cited

U.S. PATENT DOCUMENTS 8,537,828 B2    9/2013 Sugumar et al.
10,404,473 B1    9/2019 Hu et al.
(Continued)

FOREIGN PATENT DOCUMENTS

JP    2005-277453 A    10/2005
KR    10-1763827 B1    8/2017
(Continued)

OTHER PUBLICATIONS

Gleb Naumenko et al., "Erlay: Efficient Transaction Relay for Bitcoin", Session 4B: Blockchain II, CCS '19, Nov. 11-15, 2019, London, United Kingdom.
(Continued)

*Primary Examiner* — Hosain T Alam
*Assistant Examiner* — Nicholas E Allen
(74) *Attorney, Agent, or Firm* — LRK PATENT LAW FIRM

(57) ABSTRACT

A method and apparatus for block propagation in a blockchain platform. Where multiple nodes establish a peer through a peer-to-peer network and maintain the same blockchain, a node stores information of a first peer transmitted a first forwarding message in a first storage when receiving, from the first peer, which is a node on the network, the first forwarding message including a first portion associated with a block. The node transmits a second forwarding message including the first portion to a second peer that is a node on the network. The node transmits a first request message to the first peer based on information in the first storage, the first request message requesting a second portion associated with the block and corresponding to the first portion. The node receives a third forwarding message including the second portion corresponding to the first request message from the first peer.

20 Claims, 11 Drawing Sheets

(51) Int. Cl.
*H04L 9/32* (2006.01)
*H04L 67/104* (2022.01)

(58) Field of Classification Search
USPC .......................................................... 707/703
See application file for complete search history.

(56) References Cited

U.S. PATENT DOCUMENTS

| | | |
|---|---|---|
| 10,771,459 B2 | 9/2020 | Kim et al. |
| 2019/0182029 A1 | 6/2019 | Yim et al. |
| 2021/0203476 A1* | 7/2021 | van de Ruit .......... H04L 9/3236 |
| 2021/0273807 A1* | 9/2021 | Wertheim ............... G06F 9/466 |
| 2021/0312088 A1* | 10/2021 | Choi ..................... H04L 63/123 |

FOREIGN PATENT DOCUMENTS

| | | |
|---|---|---|
| KR | 10-2019-0036948 A | 4/2019 |
| WO | 2019-195755 A1 | 10/2019 |

OTHER PUBLICATIONS

A. Pinar Ozisik et al., "Graphene: efficient interactive set reconciliation applied to blockchain propagation", SIGCOMM '19, Aug. 19-23, 2019, Beijing, China.

* cited by examiner

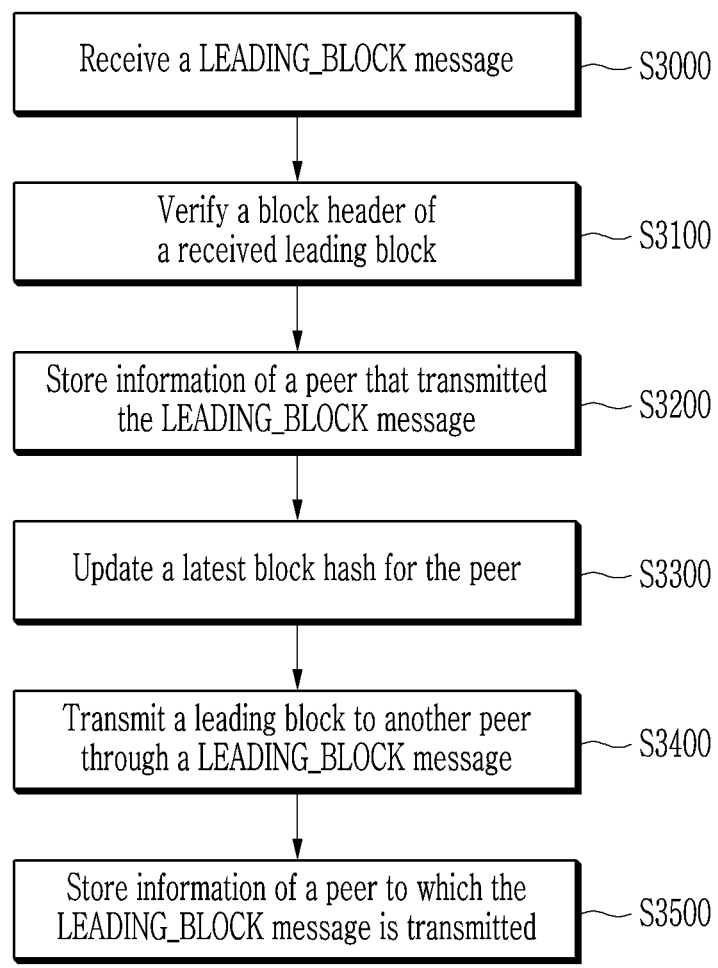

METHOD AND APPARATUS FOR BLOCK PROPAGATION IN BLOCKCHAIN PLATFORM

CROSS-REFERENCE TO RELATED APPLICATION

This application claims priority to and the benefit of Korean Patent Application No. 10-2020-0147882 filed in the Korean Intellectual Property Office on Nov. 6, 2020, the entire content of which is incorporated herein by reference.

BACKGROUND OF THE INVENTION

1. Field of the Invention

The present disclosure relates to a blockchain, and more particularly, to a method and an apparatus for block propagation in a blockchain platform.

2. Description of Related Art

Blockchain is a technology to compensate for the shortcomings of centralized data management methods. In blockchain technology, multiple nodes have the same blockchain and propagate information such as addition and modification of data through a network to update the details on the blockchain. Managing data with blockchain can allow to manage data in a decentralized way and provide data integrity and transparency.

In transmitting and managing information using a blockchain, multiple nodes establish a peer through a peer-to-peer (P2P) network and exchange various information (block and transactions) in order to maintain the same blockchain. Methods for transmitting information entering the blockchain through a P2P network are largely composed of transaction propagation and block propagation.

In the case of block propagation, a node receives a new block from a peer, verifies and adds it to own blockchain, and then propagates it to other peers. At this time, the propagation delay problem for the new block occurs by propagating it to other peers after completing verification and storage at the time the new block is received. This is fatal for blockchain platforms having short block generation cycles. In general, a new method that supplements the existing block propagation method is required because a fast block generation cycle is required to increase transaction throughput.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present disclosure has been made in an effort to provide a message-pipelining block propagation method and apparatus capable of solving a new block propagation delay problem in a blockchain platform.

An exemplary embodiment of the present disclosure provides a method for a node to propagate blocks in an environment in which multiple nodes establish a peer through a peer-to-peer (P2P) network and maintain the same blockchain.

The method includes: storing, by the node, information of a first peer that has transmitted a first forwarding message in a first storage when receiving, from the first peer, which is a node on the network, the first forwarding message including a first portion associated with a block; transmitting, by the node, a second forwarding message including the received first portion to a second peer that is a node on the network; transmitting, by the node, a first request message to the first peer based on information stored in the first storage, the first request message requesting a second portion that is associated with the block and that corresponds to the received first portion; and receiving, by the node, a third forwarding message including the second portion corresponding to the first request message from the first peer.

In an implementation, the method may include, after the transmitting of a first request message to the first peer, storing information of the first peer to which the node has transmitted the first request message in a second storage. In addition, the method may include: after the receiving of a third forwarding message, determining whether information of the first peer that has transmitted the third forwarding message is stored in the second storage; and generating and verifying a block based on the second portion included in the third forwarding message when the information of the first peer is stored in the second storage.

In an implementation, the method may include: receiving, by the node, from the second peer, a second request message that corresponds to the first portion included in the second forwarding message and that requests the second portion associated with the block; and transmitting, by the node, a fourth forwarding message including the second portion requested by the second request message to the second peer.

In an implementation, the method may include, after the transmitting of a second forwarding message, storing information of the second peer to which the node has transmitted the second forwarding message in a third storage. In addition, the method may include, after the receiving of a second request message, determining whether the information of the second peer that has transmitted the second request message is stored in the third storage. In this case, the transmitting of a fourth forwarding message may include transmitting the fourth forwarding message including the second portion to the second peer when the information of the second peer is stored in the third storage.

In an implementation, the storing of the information of a first peer that has transmitted a first forwarding message in a first storage may include: verifying the first portion included in the received first forwarding message; and updating a latest block hash corresponding to the first peer based on a block hash obtained from the verified first portion.

In an implementation, the first portion may be a block header of the block, the second portion may be a block body of the block, the block body may include a list of transactions, and the block header may include a previous block hash value, a timestamp, and a value dependent on the list of transactions.

In an implementation, the generating and verifying a block may include: generating a new block based on a block body that is the second portion included in the third forwarding message, and verifying the generated block; and adding the verified block to the node's blockchain.

In an implementation, the method may include, after the determining of whether the information of the second peer that has transmitted the second request message is stored in the third storage, determining whether there is a block body that is a second portion requested by the second request message. In this case, the transmitting of a fourth forwarding message to the second peer may include transmitting the fourth forwarding message including the block body to the second peer if there is the block body that is the second portion, and wherein the second request message may include a block hash.

In an implementation, the first portion may be a leading block, the second portion may be a transaction of the block, and the leading block may include a block header of the block and a list of sequential transaction IDs, wherein the sequential transaction ID list may be a list sequentially listing transaction IDs of transactions of the block.

In an implementation, the method may include: updating the list of sequential transaction IDs of the leading block, which is the first portion included in the first forwarding message, to a latest block transaction list; and comparing the updated latest block transaction list with a first list, wherein the first list is a list of transactions not included in the block but to be propagated, to derive a transaction that is not held by the node. In this case, the transmitting of a first request message to the first peer may include using the derived transaction as the second portion, including information related to the derived transaction in the first request message, and transmitting the first request message to the first peer.

In an implementation, the method may include, after the determining of whether the information of the first peer that has transmitted the third forwarding message is stored in the second storage, deleting transactions that are the second portion included in the third forwarding message from a second list that is a list of transactions not held by the node when the information of the first peer is stored in the third storage. In addition, the method may further include, after the transmitting of a fourth forwarding message, deleting the second portion of the transaction included in the fourth forwarding message from a third list for each peer, wherein the third list for each peer is a list of transactions requested by a peer for each peer.

In an implementation, the generating and verifying a block may include: generating a block based on the received transactions and verifying the generated block when the second list is empty after receiving all of the transactions requested by the node; and adding the verified block to the node's blockchain.

In an implementation, the method may include: transmitting the requested second portion to the peer stored in the third storage, then updating a latest block hash of the peer; and initializing at least one of the first storage, the second storage, and the third storage.

Another embodiment of the present disclosure provides a node for propagating blocks in an environment in which multiple nodes establish a peer through a peer-to-peer (P2P) network and maintain the same blockchain. The node may include: a network interface device configured to transmit/receive data through the network; a memory for storing a plurality of storages for block propagation; and a processor configured to perform block propagation with another node on the network through the network interface device. The processor may be configured to perform operations by: storing information of a first peer that has transmitted a first forwarding message in a first storage of the memory when receiving, from the first peer, which is a node on the network, the first forwarding message including a first portion associated with a block through the network interface device; transmitting a second forwarding message including the received first portion to a second peer that is a node on the network through the network interface device; transmitting a first request message to the first peer based on information stored in the first storage, the first request message requesting a second portion that is associated with the block and that corresponds to the received first portion through the network interface device; and receiving a third forwarding message including the second portion corresponding to the first request message from the first peer through the network interface device.

In an implementation, the processor may be configured to further perform operations by: after the transmitting of a first request message to the first peer, storing information of the first peer to which the node has transmitted the first request message in a second storage, wherein, in this case, the processor may be configured to further perform operations by: after the receiving of a third forwarding message, determining whether information of the first peer that has transmitted the third forwarding message is stored in the second storage; and generating and verifying a block based on the second portion included in the third forwarding message when the information of the first peer is stored in the second storage.

In an implementation, the processor may be configured to further perform operations by: receiving from the second peer, a second request message that corresponds to the first portion included in the second forwarding message and that requests the second portion associated with the block through the network interface device; and transmitting a fourth forwarding message including the second portion requested by the second request message to the second peer through the network interface device.

In an implementation, the processor may be configured to further perform operations by: after the transmitting of a second forwarding message, storing information of the second peer to which the node has transmitted the second forwarding message in a third storage wherein, in this case, the processor may be configured to further perform operations by: after the receiving of a second request message, determining whether the information of the second peer that has transmitted the second request message is stored in the third storage wherein, in this case, the processor may be configured to transmit the fourth forwarding message including the second portion to the second peer when the information of the second peer is stored in the third storage through the network interface device.

In an implementation, the processor may be configured to further perform operations by: when storing of the information of a first peer that has transmitted a first forwarding message in a first storage, verifying the first portion included in the received first forwarding message; and updating a latest block hash corresponding to the first peer based on a block hash obtained from the verified first portion.

In an implementation, the first portion may be a block header of the block, the second portion may be a block body of the block, the block body may include a list of transactions, and the block header may include a previous block hash value, a timestamp, and a value dependent on the list of transactions.

In an implementation, the first portion may be a leading block, the second portion may be a transaction of the block, and the leading block includes a block header of the block and a list of sequential transaction IDs, wherein the sequential transaction ID list is a list sequentially listing transaction IDs of transactions of the block.

BRIEF DESCRIPTION OF THE DRAWINGS

FIG. 5A to FIG. 5D are flowcharts illustrating operations performed by a node in a block propagation method according to a second embodiment of the present disclosure.

DETAILED DESCRIPTION OF THE EMBODIMENTS

Figure 1:
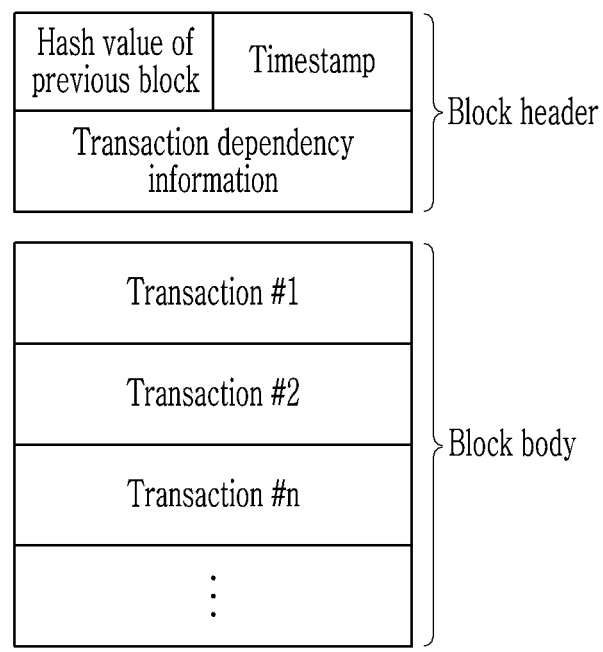
FIG. 1 is a conceptual diagram illustrating a block in a blockchain platform.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

The expressions described in the singular may be interpreted as singular or plural unless an explicit expression such as "one", "single", and the like is used.

In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component.

Hereinafter, a method and an apparatus for block propagation in a blockchain platform according to an embodiment of the present disclosure will be described with reference to the drawings.

FIG. 1 is a conceptual diagram illustrating a block in a blockchain platform.

A blockchain consists of several blocks, and one block includes a block header and a block body, as shown in FIG. 1. The block header includes a hash value of a previous block, a timestamp that is the time when the block was created, and a value that has a dependency on a transaction list (for convenience of description, it is also referred to as transaction dependency information). The block body contains a transaction list. A transaction includes details such as addition and modification of data, and the transaction list is a list of several transactions. Transactions are mapped corresponding to transaction IDs in the transaction list. The transaction ID may be a value dependent on the data entered in the transaction, for example, a hash value of the data entered in the transaction may be used as the transaction ID.

The value that has a dependency on a transaction list included in the block header is, for example, a hash value located at a root of a tree when the hash of a transaction is configured in a form of a binary tree, and may include a Merkle hash, the number of transactions, and nonces that are updated whenever a transaction occurs.

The blockchain is a form in which blocks of this structure are related to each other using the hash value of the previous block, that is, a linked list structure in which a new block includes the previous block's hash value (previous hash).

The basic method of transmitting and managing information using blockchain is as follows.

First, multiple nodes establish a peer through a P2P network to maintain the same blockchain and exchange various information (blocks and transactions) entering the blockchain. The multiple nodes exchange data modification history by propagating a transaction to the network, and a miner generating a block creates a block including the propagated transaction. The miner creates blocks that meet block generation conditions for each blockchain platform and propagate the created block to the network, and the node that receives the propagated block performs verification on the received block and adds the verified block to its own blockchain.

Methods for transmitting information entering the blockchain through a P2P network are largely composed of transaction propagation and block propagation. The transaction propagation is divided into a method of propagating transaction information as it is and a method of propagating a transaction ID. In the method of propagating transaction information as it is, when a peer receives a new transaction, the peer propagates the transaction information as it is to other connected peers. In the method of propagating transaction ID, when a peer receives a new transaction, the peer propagates the hash value (transaction ID) of the transaction to other connected peers, and then forwards information on the transaction when full transaction information is requested.

For the block propagation, when a peer receives a new block, the peer verifies the received block, adds the verified block to its own blockchain, and then propagates it to other connected peer. The block propagation has various propagation methods for each blockchain platform, and there are a header priority forwarding method and a header and transaction ID list priority forwarding method. The header priority forwarding method is widely used in various blockchain platforms, and the header and transaction ID list forwarding method is used by using a simplified transaction ID list (Short Txids) instead of the transaction ID list in the Bitcoin platform.

An embodiment of the present disclosure provides a message pipelining block propagation protocol based on a block propagation method so that a block newly created on a blockchain platform can be rapidly propagated to the entire network.

The message pipelining block propagation protocol targets the header priority forwarding method and the header and transaction ID list priority forwarding method, and performs parallel processing using a pipelining technique while processing messages sent and received as a unit during block propagation. In order to use the message pipelining block propagation protocol according to an embodiment of the present disclosure, the following must be satisfied.

The blockchain used in the blockchain platform is configured in the form of a linked list of blocks, and the latest block has a dependency on the hash value of the previous block.

A block is able to be divided into a header and a body.

The block header includes a previous block hash value, a timestamp, and a value dependent on the transaction list, and is able to verify that a corresponding block is the latest block. (In general, the hash value of the block header is used as the hash value of the current block, so only the block header can verify that that a corresponding block is the latest block.)

The block body consists of a list of transactions, and each transaction is configured differently for each blockchain platform.

The blockchain of the node using the message pipelining block propagation protocol is synchronized with most nodes.

A value that depends on the data entered in the transaction is the transaction ID. For example, the hash value of the data entered in the transaction may be used as the transaction ID.

Transaction data not included in the block but to be propagated are stored and managed in a specific storage (for example, referred to as Mempool).

When new block propagation through the message pipelining block propagation protocol fails, it is possible to use a block propagation protocol that can synchronize up to the latest block. (In this case, it is okay to use an existing block propagation protocol.)

In a state where these conditions are satisfied, the message pipelining block propagation protocol according to an embodiment of the present disclosure is largely divided into two methods.

The first method is the header priority forwarding method. Specifically, the header priority forwarding method proceeds after a node directly succeeds in creating a new block or receives a new block or data including a header of a new block from another peer. In the header priority forwarding method, the node propagates a block header to other connected peers, and then forwards a block body when the block body is requested later.

The second method is a leading block priority forwarding method. Here, the leading block represents data obtained by combining a block header and a sequential transaction ID list. The leading block may also contain a coinbase transaction with block rewards. In the case of a sequential transaction ID list, it may be replaced with a data structure that can check whether a specific transaction is included and its sequence number. The leading block priority forwarding method proceeds after a node directly succeeds in creating a new block or receives a new block or data including a new block's leading block from another peer. In the leading block priority forwarding method, the node propagates the leading block to other connected peers, and then forwards a transaction when the transaction is requested later.

The blockchain platform to which the message pipelining block propagation protocol is applied must be able to support some or both of the two methods described above.

Next, a block propagation method according to the first embodiment of the present disclosure will be described. The first embodiment of the present disclosure performs block propagation based on the header priority forwarding method of the message pipelining block propagation protocol.

In block propagation based on the header priority forwarding method according to the first embodiment of the present disclosure, protocol messages are divided into the following three types.

HEADER: This is a message that delivers a new block header, and is also called a block header forwarding message.

REQ_BODY: This is a message that requests a specific block body, and is also called a block body request message.

BODY: This is a message that delivers the requested block body, and is also called a block body forwarding message.

In the case of a REQ_BODY message, for example, a corresponding block body may be requested while delivering a block hash.

Figure 2:
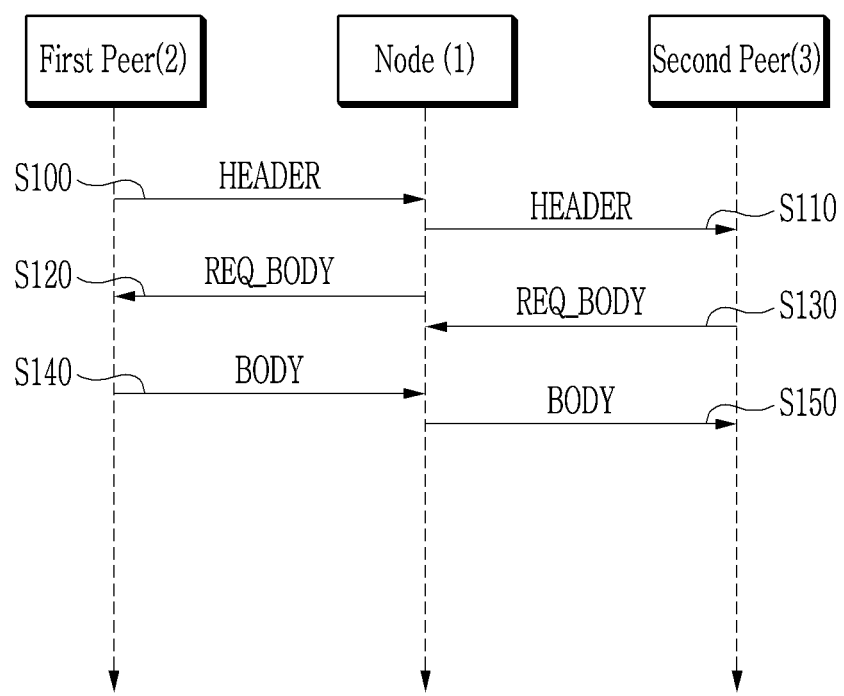
FIG. 2 is a flowchart of a block propagation method according to the first embodiment of the present disclosure.

FIG. 2 is a flowchart of a block propagation method according to the first embodiment of the present disclosure.

Here, for convenience of explanation, a block propagation method will be described centered on one node in an environment in which multiple nodes form peers through a P2P network and maintain the same blockchain.

As shown in FIG. 2, the node 1 receives a block header for a new block from a first peer 2, which is another node on the P2P network (S100). The first peer 2 transmits a block header for a new block to the node 1 through a HEADER message after it succeeds in directly creating a new block or receives a new block or data including a header of a new block from another peer. In this case, another message including a block header may be used instead of the HEADER message.

The node 1 transmits the received block header to a second peer 3, which is another connected node (S110). At this time, the node 1 transmits the received block header through the HEADER message to the second peer 3.

Meanwhile, the node 1 requests a block body corresponding to the received block header (S120). The node 1 requests the block body corresponding to the received block header from the first peer 2 using a REQ_BODY message. At this time, the node 1 may request a corresponding block body while transmitting the REQ_BODY message in which a block hash obtained based on information included in the received block header is included.

Also, the node 1 may receive a REQ_BODY message requesting a block body corresponding to the forwarded block header from the second peer 3 to which the node 1 forwarded the received block header (S130). In this case, the second peer 3 may request a corresponding block body while transmitting the REQ_BODY message in which the block hash obtained based on the information included in the received block header is included.

After requesting the block body, the node 1 receives the corresponding block body from the first peer 2 through a BODY message (S140). In this case, block bodies corresponding to the block header transmitted from the first peer 2 may be received.

Also, the node 1 transmits a block body corresponding to the request of the second peer 3 to the second peer 3 through a BODY message (S150). For example, the block body corresponding to the block hash included in the received REQ_BODY message is transmitted to the second peer 3 through the BODY message.

The order of each step performed in such a block propagation method is not limited to the order described above, and may be variously changed. For example, step S140 may be performed after step S120, and step S150 may be performed after step S130.

For the block propagation method according to the first embodiment, a node uses the following data structure.

Peer-based latest block hash: This is for sending and receiving the latest block, and it is a data structure in which the latest block hash is mapped for each peer. For example, the latest block hash may be mapped corresponding to the peer's identifier, and the latest block hash may be a value obtained by applying a hash function to information included in the block header of the latest block.

RECV_HEADER Queue: This is for receiving a block header, also called a reception header queue. Information related to the received block header is stored here. For example, information on the peer that provided the block header is stored, and the information on the peer may be an identifier of the peer.

SEND_HEADER probabilistic data structure: This is for the transfer of a block header, and is also called a transfer block header data structure.

Information on the peer to which the node forwarded the HEADER message is stored here.

SEND_REQ_BODY Queue: This is for receiving a block body, also called a block body request transmission queue. Here, information on the peer from which the node requested the block body is stored.

RECV_REQ_BODY Queue: This is for forwarding of a requested block body, also called a block body request reception queue. The RECV_REQ_BODY Queue is allocated for each peer, and the hash value of the block corresponding to the requested block body is stored in the RECV_REQ_BODY Queue allocated for each peer.

Based on this data structure, the steps performed by the node in the block propagation method according to the first embodiment of the present disclosure described above will be described in more detail as follows.

Figure 3A:
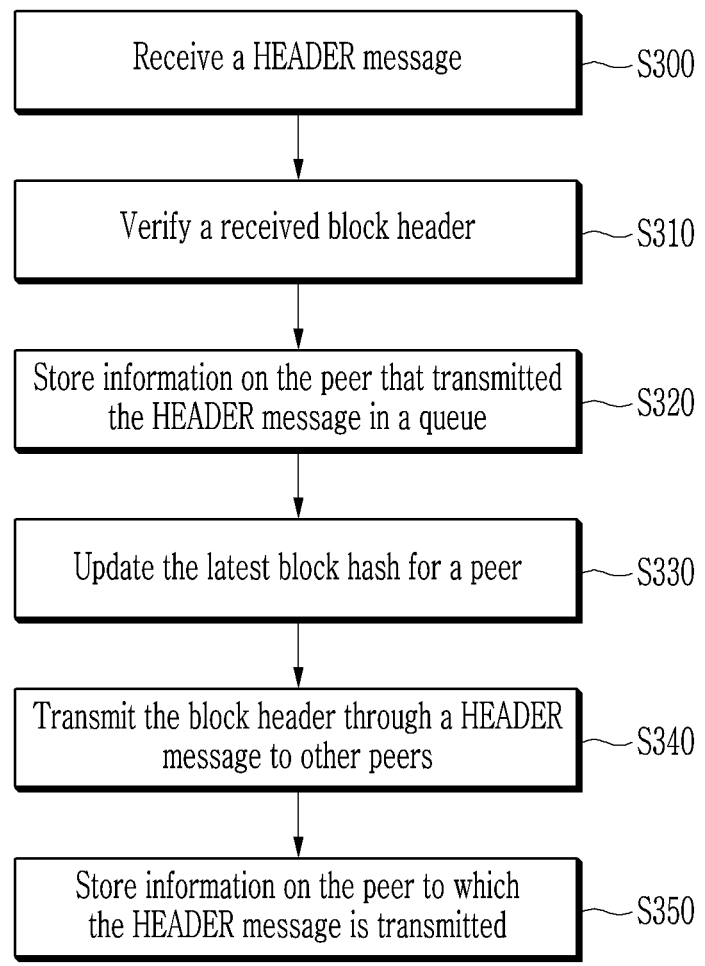
FIG. 3A to FIG. 3C are flowcharts illustrating operations performed by a node in the block propagation method according to the first embodiment of the present disclosure.
Figure 3B:
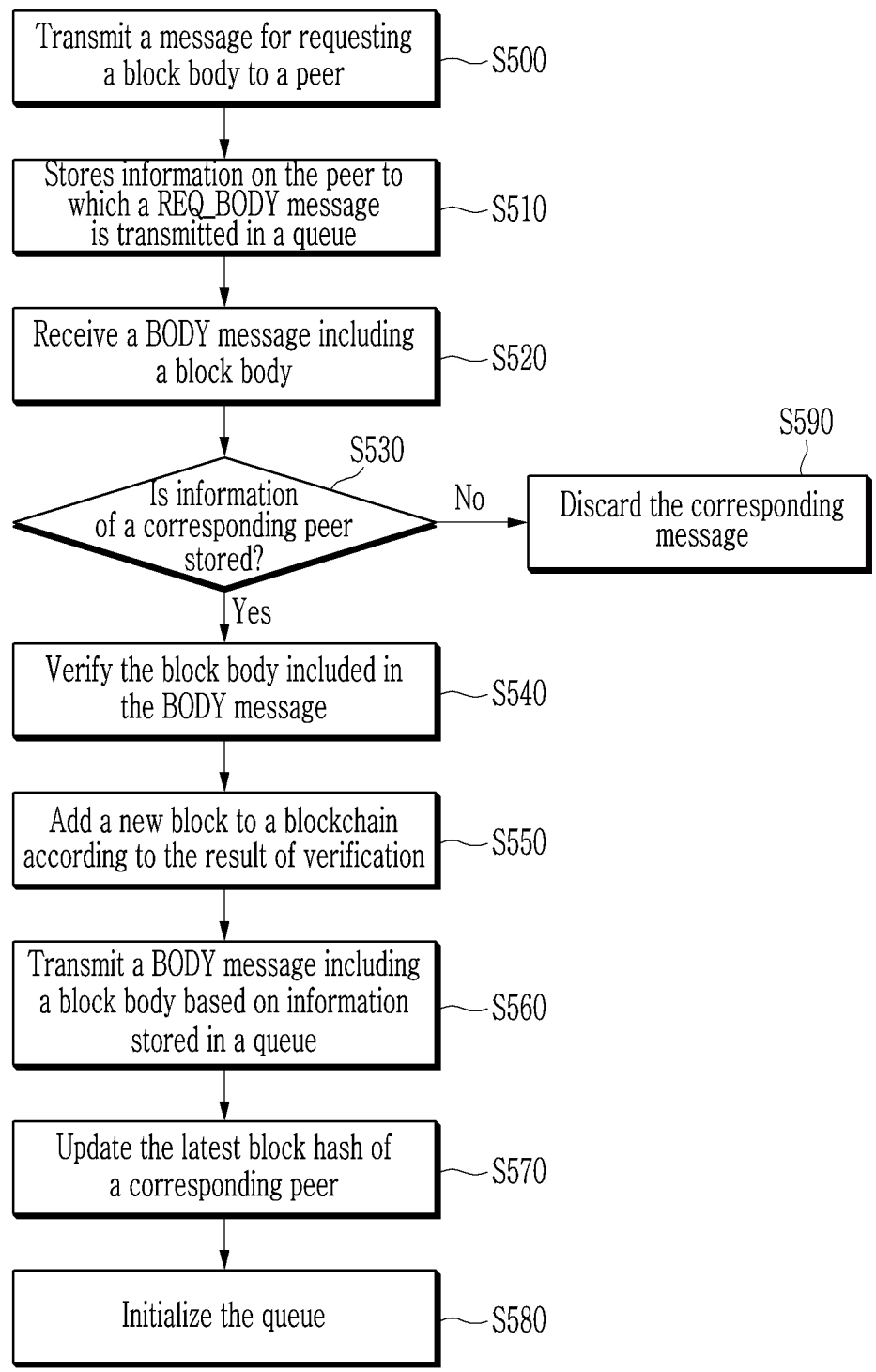
Figure 3C:
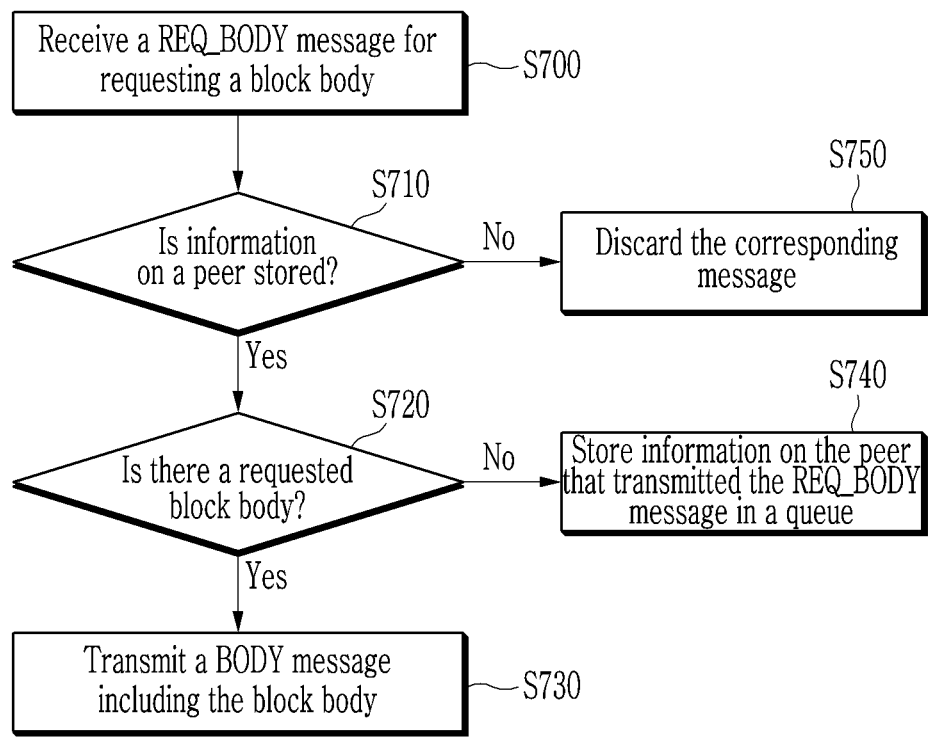

FIG. 3A to FIG. 3C are flowcharts illustrating operations performed by a node in the block propagation method according to the first embodiment of the present disclosure.

As shown in FIG. 3A, when receiving a HEADER message including a block header for a new block from a peer (e.g., a first peer), which is another node on the P2P network (S300), a node verifies whether the block header included in the received HEADER message is the latest block header (S310). For example, a block hash is obtained from information on a block header included in the received HEADER message, and whether it is the latest block header is verified using the obtained block hash.

Then, if it is verified that it is the latest block header, information on the peer that transmitted the HEADER message, for example, the first peer, is stored in the RECV_HEADER queue (S320).

Next, the latest block hash is updated for the peer that transmitted the HEADER message (S330). For example, the node updates the peer-based latest block hash, which is a data structure, based on the latest block hash, which is the block hash obtained from the verified block header.

Also, the node transmits the block header to another peer through a HEADER message (S340). Specifically, the HEADER message including the block header is transmitted to the other peers (e.g., a second peer) other than the peers stored in the RECV_HEADER queue. Here, the block header may be a block header verified as the latest block header in step S310, or may be a block header of a new block when the node succeeds in generating the new block.

Thereafter, the node stores information on the peers to which the node transmitted the HEADER message (S350). Information (e.g., a peer identifier) of the peers to which the node transmitted the HEADER message including the block header, for example the second peer, in the SEND_HEADER probabilistic data structure.

Meanwhile, the node may request a block body corresponding to the received block header from a peer or may receive a request for a block body corresponding to a transmitted block header from another peer.

The node may request a block body after the HEADER message reception process shown in FIG. 3A is completed.

As in FIG. 3B, the node may request a block body corresponding to the received block header. The node transmits a message for requesting a block body to the peer stored in the RECV_HEADER queue (S500). Specifically, the node acquires the information on the peer stored in the RECV_HEADER Queue, obtains the peer's block hash from the peer-based latest block hash based on the acquired peer information, and transmits a REQ_BODY message in which the peer's block hash is included to the corresponding peer (e.g., the first peer).

Then, the node stores the information of the peer from which the node requested the block body. Specifically, the node stores the information on the peer to which the REQ_BODY message is transmitted in the SEND_REQ_BODY queue (S510). For example, information of the first peer is stored in the SEND_REQ_BODY Queue.

Thereafter, upon receiving a BODY message (S520), the node determines whether information of the peer that has transmitted the BODY message is stored in the SEND_REQ_BODY Queue (S530).

If the information of the peer that transmitted the BODY message received in S520 is stored in the SEND_REQ_BODY Queue, where the information of the peer to which the node transmitted the REQ_BODY message is stored, the block body included in the received BODY message is verified (S540). For example, a new block is generated based on the block body included in the received BODY message, and the generated new block is verified. Here, a method for verifying a block may use various known techniques.

And the node adds the new verified block to its own blockchain (S550).

Thereafter, the node transmits the block body to peers that have requested the block body but have not been provided. Specifically, the node acquires the block hash value stored in the RECV_REQ_BODY queue allocated for each peer, and transmits a BODY message including the block body corresponding to the acquired block hash value to the corresponding peer (S560). Then, the latest block hash of the corresponding peer is updated (S570). For example, the node transmits the block body of the newly created and verified block in step S540 to the corresponding peer through the BODY message, and updates the peer-based latest block hash, which is a data structure, based on the block hash of the block.

When the node adds a new block to its blockchain, if necessary, the node transmits a request stop message for REQ_BODY requested to other peers stored in the SEND_REQ_BODY queue.

Thereafter, the node initializes the RECV_HEADER Queue and SEND_REQ_BODY Queue, which are data structures used for block propagation (S580).

Meanwhile, in step S530, if the information of the peer that transmitted the BODY message is not stored in the SEND_REQ_BODY Queue, the corresponding BODY message is discarded (S590).

Meanwhile, the node may receive a request for a block body corresponding to a transmitted block header from another peer.

The node may receive a REQ_BODY message for requesting a block body from another peer, as shown in FIG. 3C.

When the REQ_BODY message is received (S700), it is determined whether information on the peer (e.g., the second peer) that has transmitted the REQ_BODY message is in the SEND_HEADER probabilistic data structure (S710). The received REQ_BODY message may include a block hash.

If the information of the second peer, which is the peer that has transmitted the REQ_BODY message received in step S700, is stored in the SEND_HEADER probabilistic data structure in which the information of the peer to which the node transmitted the HEADER message including the block header is stored, the node determines whether there is a requested block body (S720). If there is a requested block body, the node transmits a BODY message including the corresponding block body (S730). For example, if there is a block corresponding to the block hash included in the received REQ_BODY message in its own blockchain, the node transmits a BODY message including the block body of the block to the second peer, which is the peer that requested the block body.

Meanwhile, if there is no requested block body, information on the peer that has transmitted the REQ_BODY message is stored in the RECV_REQ_BODY queue (S740). For example, if there is no block corresponding to the block hash included in the received REQ_BODY message in its blockchain, the node stores the hash value of the block corresponding to the requested block body in the RECV_REQ_BODY queue assigned to the peer that has transmitted the REQ_BODY message. Accordingly, when the node later receives a block body from another peer or creates a new block, based on the block hash value stored in the RECV_REQ_BODY Queue for each peer, the node checks for peers that have requested the block body but have not been provided, and transmits the requested block body to the checked peers.

On the other hand, in step S710, if the information of the peer that has transmitted the REQ_BODY message is not stored in the SEND_HEADER probabilistic data structure, the corresponding BODY message is discarded (S750).

Next, a block propagation method according to a second embodiment of the present disclosure will be described. The second embodiment of the present disclosure performs block propagation based on the leading block priority forwarding method of the message pipelining block propagation protocol.

In the block propagation based on the leading block priority forwarding method according to the second embodiment of the present disclosure, a protocol message is divided into the following three types.

LEADING_BLOCK: This is a message that delivers a block header and a list of sequential transaction IDs, and is called a leading block forwarding message.

REQ_TX: This is a message that requests specific transactions, and is also called a transaction request message.

TX: This is a message that delivers requested transactions, and is also called a transaction forwarding message.

In the case of the REQ_TX message, for example, a corresponding transaction may be requested while forwarding a transaction hash (transaction ID) or a transaction sequence number.

Figure 4:
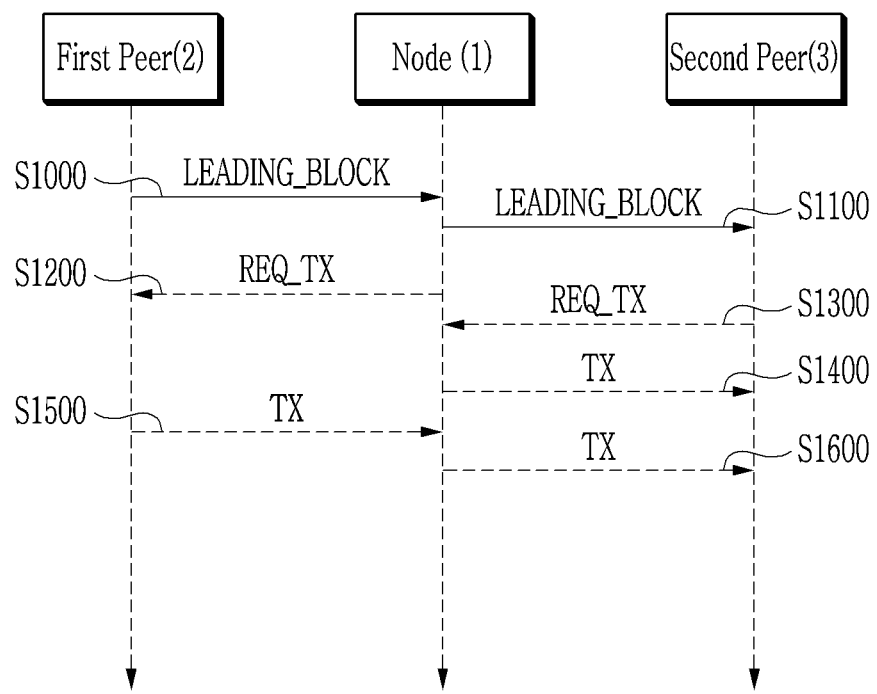
FIG. 4 is a flowchart of a block propagation method according to a second embodiment of the present disclosure.

FIG. 4 is a flowchart of a block propagation method according to a second embodiment of the present disclosure.

Here, for convenience of explanation, a block propagation method will be described centered on one node in an environment in which multiple nodes form peers through a P2P network and maintain the same blockchain.

As shown in the attached FIG. 4, a node 1 receives a leading block for a new block from a first peer 2, which is another node on the P2P network (S1000). After the first peer 2 directly succeeds in creating a new block or receives a new block or data including a leading block of a new block from another peer, the first peer 2 transmits the leading block for the new block to the node 1 through a LEADING_BLOCK message. In this case, other messages including a leading block may be used instead of the LEADING_BLOCK message. The leading block represents data combined with a block header and a list of sequential transaction IDs. The sequential transaction ID list is a list in which transaction IDs are sequentially arranged corresponding to a sequence number, respectively.

The node 1 transmits the received leading block to a second peer 3, which is another connected node (S1100). At this time, the node 1 transmits the leading block through a LEADING_BLOCK message to the second peer 3.

Meanwhile, the node 1 requests necessary transactions based on the received leading block (S1200). The node 1 requests the first peer 2 for transactions corresponding to the received leading block by using the REQ_TX message. In this case, a transaction hash (transaction ID) or a transaction sequence number obtained from the sequential transaction ID list included in the received leading block may be included in the REQ_TX message to request corresponding transactions.

Also, the node 1 may receive a REQ_TX message requesting transactions corresponding to the transmitted leading block from the second peer 3 to which the node 1 transmitted the received leading block (S1300). In this case, the second peer 3 may request corresponding transactions while transmitting, in the REQ_TX message, a transaction hash (transaction ID) or a transaction sequence number obtained from the sequential transaction ID list included in the received leading block.

In response to the request of the second peer 3, the node 1 transmits the transactions corresponding to the transaction hash (transaction ID) or transaction sequence included in the REQ_TX message to the second peer 3 through a TX message (S1400). At this time, among the requested transactions, the transactions held by the node 1 are transmitted to the second peer 3 through the TX message.

In addition, the node 1 receives corresponding transactions through a TX message from the first peer 2 after requesting the transactions (S1500). In this case, transactions corresponding to the received leading block from the first peer 2 may be received.

Thereafter, the node 1 transmits the transactions that have been requested in step S1400 but have not been transmitted to the second peer 3 through a TX message (S1600).

The order of each step performed in such a block propagation method is not limited to the order described above, and may be variously changed. For example, step S1500 may be performed after step S1200, and then steps S1300 and S1400 may be performed.

For the block propagation method according to the second embodiment, a node includes the following data structure.

Peer-based latest block hash: This is for sending and receiving the latest block, and it is a data structure in which the latest block hash is mapped for each peer. For example, the latest block hash may be mapped corresponding to the peer's identifier, and the latest block hash may be a value obtained by applying a hash function to information included in the block header of the latest block.

Latest block transaction list: This is for transmitting and receiving the latest block, and represents the list of transactions included in the latest block.

KEEPING_TX Probabilistic data structure: This is for estimating the peer's mempool, and may be configured for each peer. For example, transaction data not included in the block but to be propagated is stored.

RECV_LEADING_BLOCK Queue: This is for receiving a leading block, and is also called a reception leading block queue. Information related to the received leading block is stored here. For example, information on the peer that provided the corresponding leading block is stored, and the information on the peer may be an identifier of the peer.

SEND_LEADING_BLOCK probabilistic data structure: This is for forwarding the leading block, and is also called a forwarding leading block data structure. Here, information of the peer to which the node transmitted the LEADING_BLOCK message is stored.

SEND_REQ_TX Queue: This is for the reception of transactions that are not held, and is also called a transaction request transmission queue. Here, information of the peer from which the node requested the transaction is stored.

RECV_REQ_TX Queue: This is for the forwarding of transactions that are not held, and is also called a transaction request reception queue. Here, a RECV_REQ_TX queue is allocated for each peer, and the requested transaction ID information is stored in the RECV_REQ_TX queue allocated for each peer.

REQ_TX_LIST: This is for the reception of transactions that are not held, and represents a list of transactions not held or a list of transactions requested by the node.

PEER_REQ_TX_LIST: This is for the transmission of transactions that are not held, and represents a list of transactions for which a node is requested to be delivered from a peer. PEER_REQ_TX_LIST may be configured for each peer.

Based on this data structure, the steps performed by the node in the block propagation method according to the second embodiment of the present disclosure described above will be described in more detail as follows.

FIG. 5A to FIG. 5D are flowcharts illustrating operations performed by a node in a block propagation method according to a second embodiment of the present disclosure.

As shown in FIG. 5A, when a node receives a LEADING_BLOCK message including a leading block for a new block from a peer (e.g., a first peer), which is another node on the P2P network (S3000), the node verifies whether the block header included in the received LEADING_BLOCK message is the latest block header (S3100). For example, a block hash is obtained from the block header information included in the received LEADING_BLOCK message, and it is verified whether the block header is the latest block header using the obtained block hash.

And if it is verified that it is the latest block header, information of the peer that has transmitted the LEADING_BLOCK message, for example, the first peer, is stored in the RECV_LEADING_BLOCK queue (S3200).

Next, the latest block hash is updated for the peer that has transmitted the LEADING_BLOCK message (S3300). The node updates the peer-based latest block hash, which is a data structure, based on the latest block hash, which is the block hash obtained from the verified block header.

The node transmits a leading block to another peer through a LEADING_BLOCK message (S3400). Specifically, the LEADING_BLOCK message including the leading block is transmitted to the other peers (e.g., a second peer) other than the peers stored in the RECV_LEADING_BLOCK queue. Here, the leading block may include the block header verified as the latest block header and the sequential transaction ID list in step S3100, or when the node succeeds in creating a new block, a block header of the new block and a list of sequential transaction IDs based on transactions of the new block may be included in the leading block.

Thereafter, the node stores information of the peer to which the node transmitted the LEADING_BLOCK message (S3500). The node stores the information of the peer to which the LEADING_BLOCK message including the leading block has been transmitted, for example, the second peer, in the SEND_LEADING_BLOCK probabilistic data structure.

Meanwhile, the node may request transactions corresponding to the received leading block from the peer or may request transactions corresponding to the leading block from another peer.

When the LEADING_BLOCK message reception process shown in FIG. 5A is finished, the node may request a transaction.

Figure 5B:
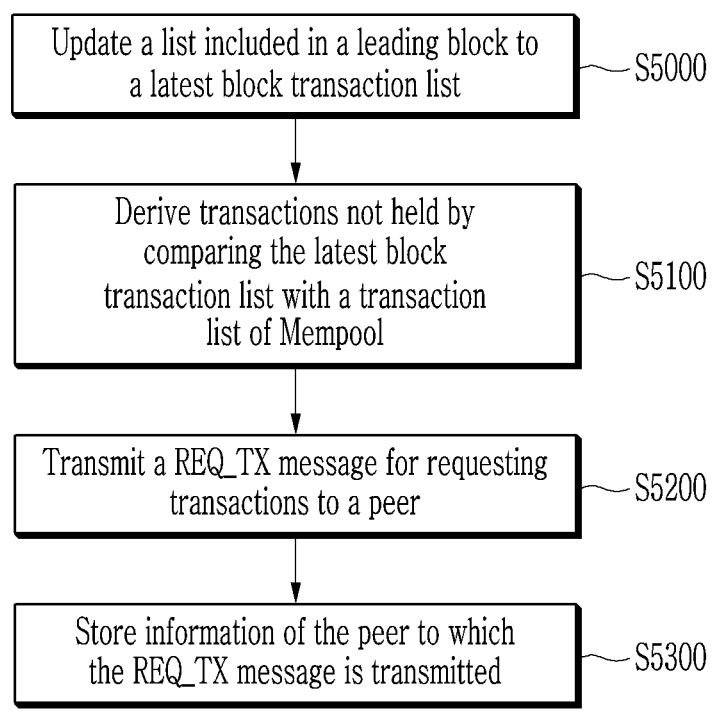

As shown in FIG. 5B, the node may request a transaction corresponding to the received leading block. To this end, the node updates the sequential transaction ID list included in the leading block to the latest block transaction list (S5000). That is, the sequential transaction ID list included in the leading block is updated based on the latest block transaction list, which is a data structure. If the block/block header/leading block generated by the node itself or received from another peer is verified to be the latest block, the transaction list of the latest block may be stored in the latest block transaction list as it is.

And, by comparing the latest block transaction list with the transaction list of Mempool, transactions not held are derived (S5100). The Mempool is a storage in which transactions which are not included in a block but are valid and will be propagated are waiting, and a list of these transactions is stored. The node finds transactions that are not included in the latest block transaction list, that is, transactions that do not hold, from the list of transactions stored in the Mempool.

Thereafter, the node transmits a message for requesting transactions not held from the peer stored in the RECV_LEADING_BLOCK queue (S5200). Specifically, the node acquires information on the peer stored in the RECV_LEADING_BLOCK Queue, includes the hash or sequence number of the transactions that are not held but derived in the above step (S5100) in a REQ_TX message, and transmits the REQ_TX message to the corresponding peer (e.g., a first peer). The hash or sequence number of the transactions that are not held but derived, and transmitted to the peer are stored in REQ_TX_LIST as they are.

Then, the node stores the information of the peer that requested the transaction. Specifically, the node stores the information of the peer to which the REQ_TX message is transmitted in the SEND_REQ_TX Queue (S5300). For example, information of the first peer is stored in the SEND_REQ_TX Queue.

On the other hand, the node may receive transactions from other peers.

Figure 5C:
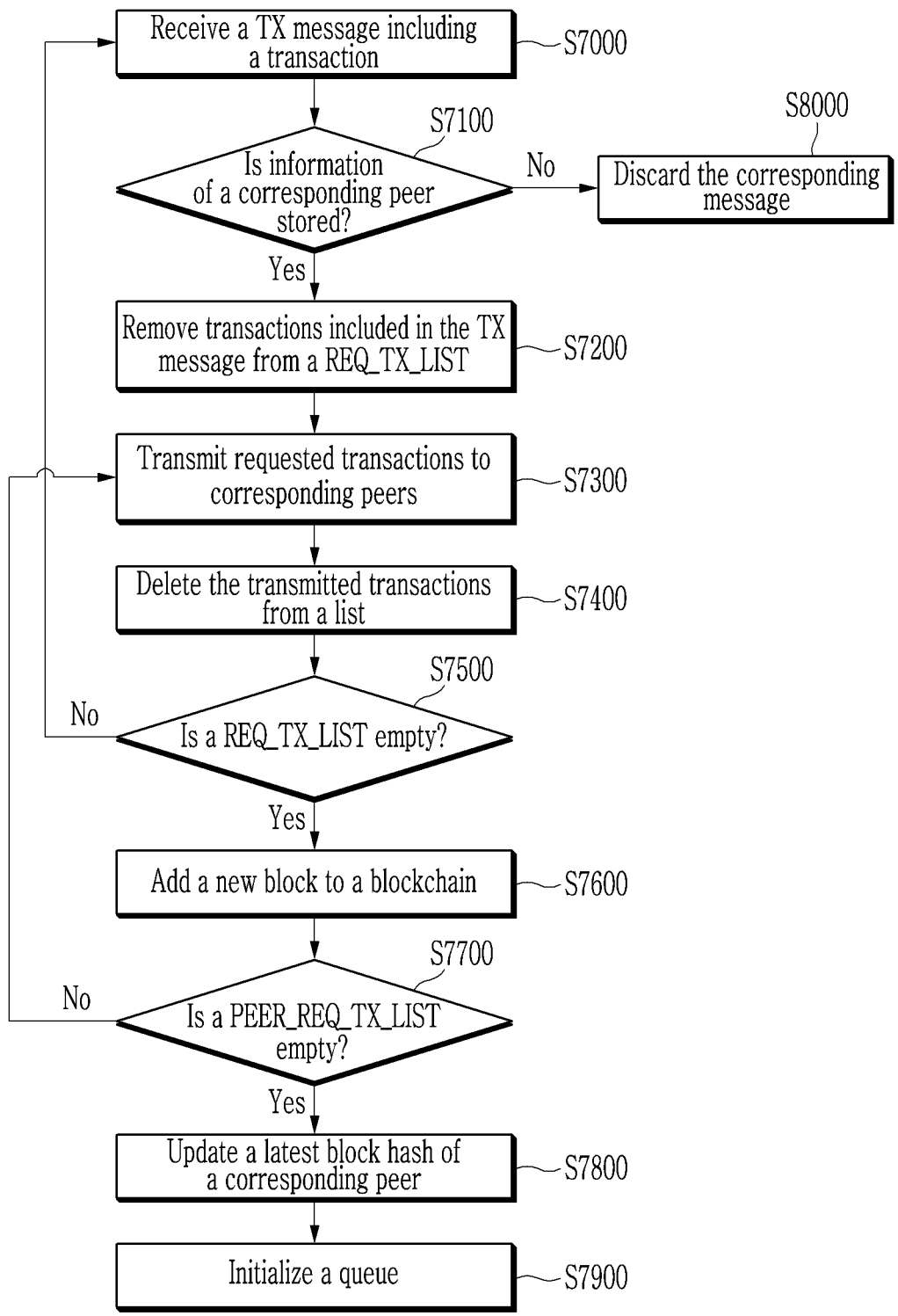

As shown in FIG. 5C, when the node receives a TX message (S7000), it determines whether information of the peer that has transmitted the TX message is stored in the SEND_REQ_TX Queue (S7100).

If the information of the peer that has transmitted the received TX message is stored in the SEND_REQ_TX Queue in which information of peers to which the node transmitted the REQ_TX message is stored, a corresponding transaction is removed from a REQ_TX_LIST (S7200). That is, transactions included in the received TX message are removed from the REQ_TX_LIST, which is a list of transactions requested by the node, Also, the node transmits corresponding transactions to the peer requesting the transfer of the transaction (S7300). The node transmits the transaction using a RECV_REQ_TX Queue, which stores information of the peer requested to transmit the transaction, and a PEER_REQ_TX_LIST, which is a list of transactions requested to be transmitted by each peer. Specifically, it acquires the transaction ID information included in the RECV_REQ_TX queue for each peer, checks the transactions in the PEER_REQ_TX_LIST of the corresponding peer, and transmits a TX message including the transaction corresponding to the acquired transaction ID to the corresponding peer.

Then, the transmitted transactions are deleted from the peer's PEER_REQ_TX_LIST (S7400).

If necessary, the node transmits a corresponding transaction request stop message to other peers in the SEND_REQ_TX Queue where the information of the peer requesting the transaction is stored. When a node adds a new block to its blockchain, it transmits a request stop message for REQ_TX requested to other peers stored in the SEND_REQ_TX queue as needed.

Meanwhile, in order to check whether a new block can be created with the received transaction, the node checks whether a REQ_TX_LIST, which is a list of transactions requested by the node, is empty (S7500).

When the REQ_TX_LIST is empty because the node has received all requested transactions, a new block is created based on the received transaction and the new block is added to the blockchain (S7600). At this time, the created new block can be verified and the verified block can be added to the blockchain.

Then, the node obtains the information of the peer requested to transmit the transaction from the RECV_REQ_TX Queue, and checks whether the PEER_REQ_TX_LIST of the corresponding peer is empty (S7700).

If the PEER_REQ_TX_LIST is empty, the latest block hash of the corresponding peer is updated (S7800). For example, the latest block hash of the peer may be updated based on the block hash of the block that is created in step S7600 and added to the blockchain.

Thereafter, the node initializes the RECV_LEADING_BLOCK Queue and SEND_REQ_TX Queue, which are data structures used for block propagation (S7900).

Meanwhile, in step S7100, if the information of the peer that has transmitted the TX message is not stored in the SEND_REQ_TX Queue, the TX message is discarded (S8000).

On the other hand, the node may receive a request for a transaction corresponding to a transmitted leading block from another peer.

Figure 5D:
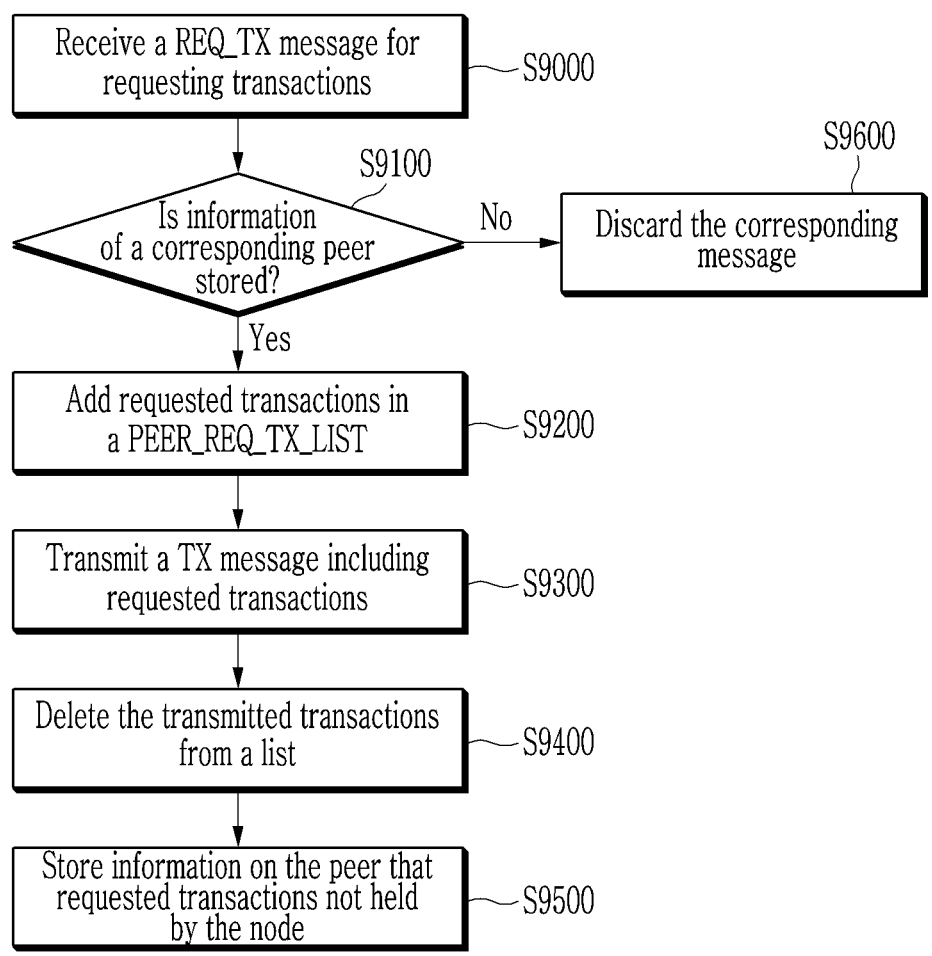

The node may receive a REQ_TX message including a hash or sequence number of transactions from another peer, as in FIG. 5D.

When the REQ_TX message is received (S9000), it is determined whether information of the peer (e.g., a second peer) that has transmitted the REQ_TX message is in a SEND_LEADING_BLOCK probabilistic data structure (S9100). The received REQ_TX message includes the transaction hash or transaction sequence number.

If the information of the second peer, which is the peer that has transmitted the REQ_TX message received in step S9000, is stored in the SEND_LEADING_BLOCK probabilistic data structure in which the information of the peer to which the node transmitted the LEADING_BLOCK message including the leading block is stored, the node adds the requested transactions to a PEER_REQ_TX_LIST (S9200). Specifically, the node adds the hash or sequence number of the transactions included in the received REQ_TX message to the PEER_REQ_TX_LIST of the corresponding peer.

Then, a TX message including transactions corresponding to the hash or sequence number included in the PEER_REQ_TX_LIST is transmitted to the corresponding peer (S9300). Then, the transactions transmitted through the TX message are deleted from the PEER_REQ_TX_LIST. That is, the hash or sequence number corresponding to the transactions transmitted from PEER_REQ_TX_LIST is deleted (S9400).

On the other hand, if a transaction not held by the node remains in the PEER_REQ_TX_LIST, the node stores information on the peer that has transmitted the REQ_TX message in a RECV_REQ_TX Queue (S9500). Specifically, since the node does not have the transaction corresponding to the hash or sequence number included in the PEER_REQ_TX_LIST, the transaction is not transmitted and then the hash or sequence number of the transaction remains in the PEER_REQ_TX_LIST. In this case, the node stores the ID information of the transaction (it may correspond to the remaining hash or sequence number of the transaction) requested from a corresponding peer in the RECV_REQ_TX Queue assigned to the peer. Accordingly, when a transaction that could not be transmitted later is retained, the transaction that could not be transmitted can be transmitted to a corresponding peer through a TX message based on the RECV_REQ_TX Queue and the PEER_REQ_TX_LIST.

Meanwhile, in step S9100, if the information of the peer that has transmitted the REQ_TX message is not stored in the SEND_LEADING_BLOCK probabilistic data structure, the message is discarded (S9600).

According to this embodiment of the present disclosure, block propagation can be performed based on message pipelining, which can be divided into a block header priority forwarding method and a leading block priority forwarding method in a blockchain platform. In particular, since the block header or the leading block is transmitted first, and then the block body or the transaction is transmitted while the generation or verification of the new block is performed, the propagation delay for the new block can be reduced.

Accordingly, in the propagation of the new block, a plurality of nodes can synchronize the new block with minimal verification and message exchange, thereby solving the propagation delay problem.

Figure 6:
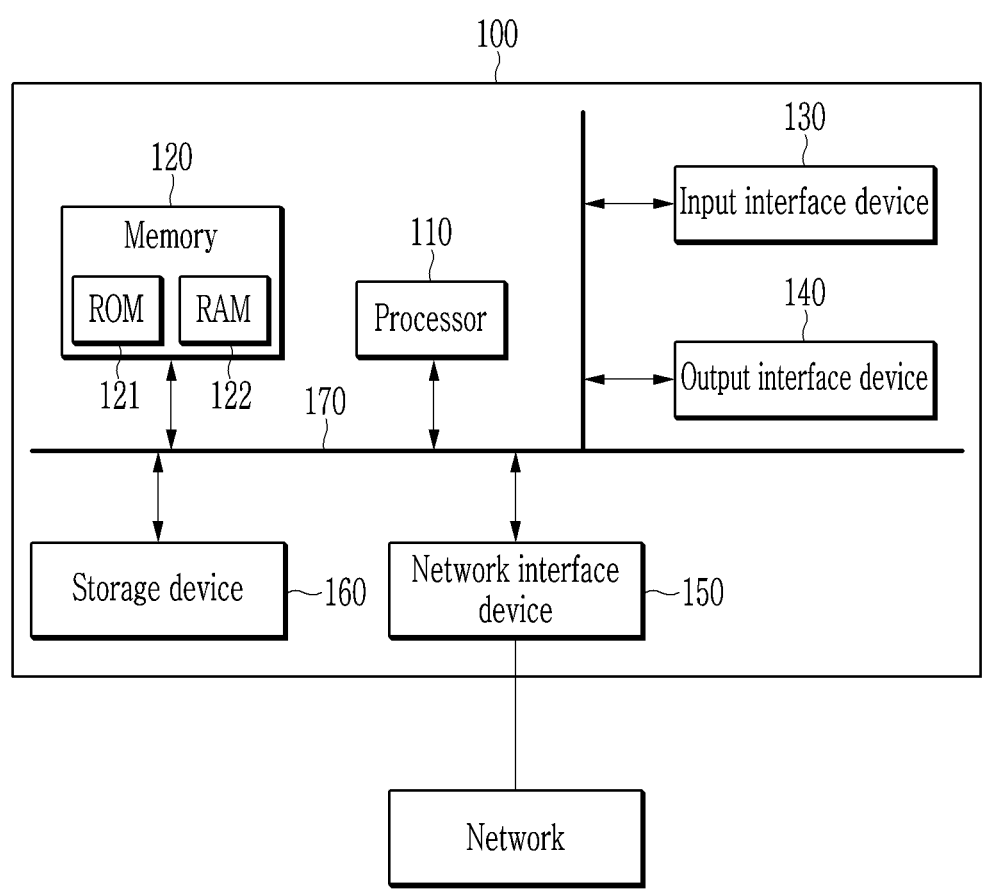
FIG. 6 is a structural diagram illustrating a computing device for implementing a block propagation method according to an embodiment of the present disclosure.

FIG. 6 is a structural diagram illustrating a computing device for implementing a block propagation method according to an embodiment of the present disclosure.

As shown in FIG. 6, the block propagation method according to an embodiment of the present disclosure may be implemented using the computing device 100.

The computing device 100 includes at least one among a processor 110, a memory 120, an input interface device 130, an output interface device 140, a network interface device 150, and a storage device 160.

Each of the components may be connected by a bus 170 to communicate with each other. In addition, each of the components may be connected through an individual interface or a separate bus centering on the processor 110 instead of the common bus 170.

The processor 110 may be implemented in various types such as an application processor (AP), a central processing unit (CPU), a graphics processing unit (GPU), and the like, and may be any semiconductor device that executes a command stored in the memory 120 or the storage device 160. The processor 110 may execute a program command stored in at least one of the memory 120 and the storage device 160. The processor 110 may be configured to implement the function and the method described based on FIG. 1, FIG. 2, FIG. 3A to FIG. 3C, FIG. 4, and FIG. 5A to FIG. 5D.

The memory 120 and the storage device 160 may include various types of volatile or non-volatile storage media. For example, the memory 120 may include a read-only memory (ROM) 121 and a random access memory (RAM) 122. In an embodiment of the present disclosure, the memory 120 and the storage device 160 may be located inside or outside the processor 110, and the memory 120 and the storage device 160 may be connected to the processor 110 through various known means. Also, the memory 120 may be implemented in a data structure (also called storage) configured to store various data including queues in the memory 120 may be implemented to be stored.

The input interface device 130 may be configured to receive data and forward the data to the processor 110, and the output interface device 130 may be configured to output the result of the processor 110.

The network interface device 150 may be configured to receive or transmit a signal from/to another entity (e.g., peers on the P2P network) through a wired network or a wireless network.

The computing device 100 having such a structure is referred to as a node, and may implement the block propagation method according to an embodiment of the present disclosure. In addition, at least part of the block propagation method according to an embodiment of the present disclosure may be implemented as a program or software executed in the computing device 1000, and the program or software may be stored in a computer-readable medium.

In addition, at least part of the block propagation method according to an embodiment of the present disclosure may be implemented with hardware that can be electrically connected to the computing device 1000

According to embodiments, when a new block is generated in a blockchain platform, block propagation can be performed with minimal verification and message exchange. Therefore, the delay problem of the new block can be solved, and a plurality of nodes can quickly synchronize the latest block.

The embodiments of the present disclosure are not implemented only through the apparatus and/or method described above, but may be implemented through a program for realizing a function corresponding to the configuration of the embodiment of the present disclosure, and a recording medium in which the program is recorded. This implementation can also be easily performed by expert person skilled in the technical field to which the present disclosure belongs from the description of the above-described embodiments.

The components described in the embodiment s may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the embodiment s may be implemented by software, and the software may be recorded on a recording medium. The components, functions, and processes described in the embodiment s may be implemented by a combination of hardware and software.

The method according to embodiment s may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated with, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific embodiment. Features described in the specification in the context of individual embodiment s may be implemented as a combination in a single embodiment. In contrast, various features described in the specification in the context of a single embodiment may be implemented in multiple embodiment s individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood that the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described embodiment s in all embodiment s, and it should be understood that the above-described program components and apparatuses may be incorporated into a single software product or may be packaged in multiple software products. It should be understood that the embodiment s disclosed herein are merely illustrative and are not intended to limit the scope of the disclosure. It will be apparent to one of ordinary skill in the art that various modifications of the embodiment s may be made without departing from the spirit and scope of the claims and their equivalents.

What is claimed is:

1. A method for a node to propagate blocks in an environment in which multiple nodes establish a peer through a peer-to-peer (P2P) network and maintain the same blockchain, the method comprising:
storing, by the node, information of a first peer that has transmitted a first forwarding message in a first storage when receiving, from the first peer, which is a node on the network, the first forwarding message including a first portion associated with a block;
transmitting, by the node, a second forwarding message including the received first portion to a second peer that is a node on the network;
transmitting, by the node, a first request message to the first peer based on information stored in the first storage, the first request message requesting a second portion that is associated with the block and that corresponds to the received first portion; and
receiving, by the node, a third forwarding message including the second portion corresponding to the first request message from the first peer,
wherein the first portion includes a block header of the block or a leading block, and
wherein the second portion is the block body of the block or the second portion is a transaction of the block.

2. The method of claim 1, further comprising:
after the transmitting of a first request message to the first peer,
storing information of the first peer to which the node has transmitted the first request message in a second storage,
wherein the method further comprises:
after the receiving of a third forwarding message,
determining whether information of the first peer that has transmitted the third forwarding message is stored in the second storage; and
generating and verifying a block based on the second portion included in the third forwarding message when the information of the first peer is stored in the second storage.

3. The method of claim 2, further comprising:
receiving, by the node, from the second peer, a second request message that corresponds to the first portion included in the second forwarding message and that requests the second portion associated with the block; and
transmitting, by the node, a fourth forwarding message including the second portion requested by the second request message to the second peer.

4. The method of claim 3, further comprising:
after the transmitting of a second forwarding message,
storing information of the second peer to which the node has transmitted the second forwarding message in a third storage,
wherein the method further comprises
after the receiving of a second request message,
determining whether the information of the second peer that has transmitted the second request message is stored in the third storage, and
the transmitting of a fourth forwarding message comprises transmitting the fourth forwarding message including the second portion to the second peer when the information of the second peer is stored in the third storage.

5. The method of claim 1, wherein the storing of the information of a first peer that has transmitted a first forwarding message in a first storage comprises:
verifying the first portion included in the received first forwarding message; and
updating a latest block hash corresponding to the first peer based on a block hash obtained from the verified first portion.

6. The method of claim 4, wherein:
the first portion is a block header of the block, the second portion is a block body of the block,
the block body includes a list of transactions, and
the block header includes a previous block hash value, a timestamp, and a value dependent on the list of transactions.

7. The method of claim 6, wherein the generating and verifying a block comprises:
generating a new block based on a block body that is the second portion included in the third forwarding message, and verifying the generated block; and
adding the verified block to the node's blockchain.

8. The method of claim 6, further comprising:
after the determining of whether the information of the second peer that has transmitted the second request message is stored in the third storage,
determining whether there is a block body that is a second portion requested by the second request message,
wherein the transmitting of a fourth forwarding message to the second peer comprises transmitting the fourth forwarding message including the block body to the second peer if there is the block body that is the second portion, and
wherein the second request message includes a block hash.

9. The method of claim 4, wherein:
the first portion is a leading block, the second portion is a transaction of the block, and
the leading block includes a block header of the block and a list of sequential transaction IDs, wherein the sequential transaction ID list is a list sequentially listing transaction IDs of transactions of the block.

10. The method of claim 9, wherein further comprising:
before the transmitting of a first request message to the first peer,
updating the list of sequential transaction IDs of the leading block, which is the first portion included in the first forwarding message, to a latest block transaction list; and
comparing the updated latest block transaction list with a first list, wherein the first list is a list of transactions not included in the block but to be propagated, to derive a transaction that is not held by the node, and
wherein the transmitting of a first request message to the first peer comprises, using the derived transaction as the second portion, including information related to the derived transaction in the first request message, and transmitting the first request message to the first peer.

11. The method of claim 9, further comprising
after the determining of whether the information of the first peer that has transmitted the third forwarding message is stored in the second storage,
deleting transactions that are the second portion included in the third forwarding message from a second list that is a list of transactions not held by the node when the information of the first peer is stored in the third storage,
wherein the method further comprises
after the transmitting of a fourth forwarding message,
deleting the second portion of the transaction included in the fourth forwarding message from a third list for each peer, wherein the third list for each peer is a list of transactions requested by a peer for each peer.

12. The method of claim 9, wherein the generating and verifying a block comprises:
generating a block based on the received transactions and verifying the generated block when the second list is empty after receiving all of the transactions requested by the node; and
adding the verified block to the node's blockchain.

13. The method of claim 4, further comprising:
transmitting the requested second portion to the peer stored in the third storage, then updating a latest block hash of the peer; and
initializing at least one of the first storage, the second storage, and the third storage.

14. A node for propagating blocks in an environment in which multiple nodes establish a peer through a peer-to-peer (P2P) network and maintain the same blockchain, the node comprising:
a network interface device configured to transmit/receive data through the network;
a memory for storing a plurality of storages for block propagation; and
a processor configured to perform block propagation with another node on the network through the network interface device,
wherein the processor is configured to perform operations by:
storing information of a first peer that has transmitted a first forwarding message in a first storage of the memory when receiving, from the first peer, which is a node on the network, the first forwarding message including a first portion associated with a block through the network interface device;
transmitting a second forwarding message including the received first portion to a second peer that is a node on the network through the network interface device;
transmitting a first request message to the first peer based on information stored in the first storage, the first request message requesting a second portion that is associated with the block and that corresponds to the received first portion through the network interface device; and
receiving a third forwarding message including the second portion corresponding to the first request message from the first peer through the network interface device,
wherein the first portion includes a block header of the block or a leading block, and
wherein the second portion is the block body of the block or the second portion is a transaction of the block.

15. The node of claim 14, wherein
the processor is configured to further perform operations by:
after the transmitting of a first request message to the first peer,
storing information of the first peer to which the node has transmitted the first request message in a second storage; and
the processor is configured to further perform operations by:
after the receiving of a third forwarding message,
determining whether information of the first peer that has transmitted the third forwarding message is stored in the second storage; and
generating and verifying a block based on the second portion included in the third forwarding message when the information of the first peer is stored in the second storage.

16. The node of claim 15, wherein
the processor is configured to further perform operations by:
receiving from the second peer, a second request message that corresponds to the first portion included in the second forwarding message and that requests the second portion associated with the block through the network interface device; and
transmitting a fourth forwarding message including the second portion requested by the second request message to the second peer through the network interface device.

17. The node of claim 16, wherein
the processor is configured to further perform operations by:
after the transmitting of a second forwarding message,
storing information of the second peer to which the node has transmitted the second forwarding message in a third storage, and
the processor is configured to further perform operations by:
after the receiving of a second request message,
determining whether the information of the second peer that has transmitted the second request message is stored in the third storage, and
wherein the processor is configured to transmit the fourth forwarding message including the second portion to the second peer when the information of the second peer is stored in the third storage through the network interface device.

18. The node of claim 14, wherein the processor is configured to further perform operations by:

when storing of the information of a first peer that has transmitted a first forwarding message in a first storage, verifying the first portion included in the received first forwarding message; and updating a latest block hash corresponding to the first peer based on a block hash obtained from the verified first portion.

19. The node of claim 14, wherein:

the first portion is a block header of the block, the second portion is a block body of the block, the block body includes a list of transactions, and the block header includes a previous block hash value, a timestamp, and a value dependent on the list of transactions.

20. The node of claim 14, wherein:

the first portion is a leading block, the second portion is a transaction of the block, and the leading block includes a block header of the block and a list of sequential transaction IDs, wherein the sequential transaction ID list is a list sequentially listing transaction IDs of transactions of the block.

\* \* \* \* \*